(12) United States Patent
Torrance et al.

(10) Patent No.: US 8,126,398 B2
(45) Date of Patent: Feb. 28, 2012

(54) AUTHENTICATING DEVICES FOR RF COMMUNICATIONS

(75) Inventors: Jeffery Torrance, Cambridge (GB); Jonathan Kimmitt, Cambridgeshire (GB); James Collier, Ely (GB)

(73) Assignee: Cambridge Silicon Radio Limited, Cambridge (GB)

( * ) Notice: Subject to any disclaimer, the term of this patent is extended or adjusted under 35 U.S.C. 154(b) by 749 days.

(21) Appl. No.: 11/923,716

(22) Filed: Oct. 25, 2007

(65) Prior Publication Data

US 2008/0113619 A1    May 15, 2008

(30) Foreign Application Priority Data

Nov. 9, 2006   (GB) .................................. 0622366.3

(51) Int. Cl.
*H04B 7/00* (2006.01)
*G10L 15/00* (2006.01)
*G06F 7/04* (2006.01)

(52) U.S. Cl. ............ 455/41.2; 455/411; 726/4; 704/231

(58) Field of Classification Search ................. 455/41.2, 455/411; 704/231; 726/4
See application file for complete search history.

(56) References Cited

U.S. PATENT DOCUMENTS

| | | | |
|---|---|---|---|
| 7,861,092 B2 * | 12/2010 | Wei et al. ...................... | 713/186 |
| 2002/0123325 A1 * | 9/2002 | Cooper ......................... | 455/411 |
| 2003/0095521 A1 * | 5/2003 | Haller et al. .................. | 370/338 |
| 2004/0001553 A1 * | 1/2004 | Steentra et al. ............... | 375/260 |
| 2004/0083368 A1 * | 4/2004 | Gehrmann .................... | 713/171 |
| 2005/0262418 A1 * | 11/2005 | Gehrmann .................... | 714/758 |
| 2007/0192488 A1 * | 8/2007 | DaCosta ....................... | 709/225 |
| 2008/0002882 A1 * | 1/2008 | Voloshynovskyy et al. .. | 382/181 |

* cited by examiner

*Primary Examiner* — Temesgh Ghebretinsae
*Assistant Examiner* — Gennadiy Tsvey
(74) *Attorney, Agent, or Firm* — Novak Druce DeLuca + Quigg LLP

(57) ABSTRACT

A communications system includes a first and second device capable of transmitting and receiving RF communications; a controller for the first device capable of receiving or transmitting a code via a non-RF communication; a controller for the second device capable of receiving the code via a non-RF communication; and a processor for authenticating the first device for RF communication with the second device using the received code.

9 Claims, 4 Drawing Sheets

AUTHENTICATING DEVICES FOR RF COMMUNICATIONS

FIELD OF INVENTION

The present invention relates to authenticating one device with another device for RF (radio frequency) communications.

BACKGROUND OF THE INVENTION

An increasing number of devices are incorporating wireless radio communications systems, such as a short range wireless system called Bluetooth. Examples of these devices include wireless headsets, mobile phones, laptop computers, wireless mice and PDAs.

One advantage of wireless communication systems is the ability to connect a first user device to a second interdependent device, such as connecting a headset to a handset for a telecommunications system.

One drawback to interconnecting wireless devices is the risk of interception of inter-device communications or unauthorised access of one of the devices.

This drawback is alleviated by authenticating the first device with the other device.

A typical authentication method requires the user of the devices to enter a 4-digit PIN (personal identification number) stored in one device into the other device. In this method the user is notified of the PIN by the retailer of the device. To authenticate the second device for RF communications with the first device the user provides the second device with the PIN using an entry keypad. The keypad generally provides other functions for the second device and the user is generally required to search through menu options on the second device to activate the PIN entry function.

Once the second device receives the PIN it initiates a key exchange with the first device over RF communications using the PIN as an initial authenticator. The end result of the key exchange is a secure RF communications channel between the first and second device.

One difficulty with the described PIN authentication method is that the user must remember the PIN stored on the first device. If the user forgets the PIN, the user has to contact the retailer or manufacturer of the device. This is an undesirable situation for both the user and the retailer/manufacturer.

As a result of the above some devices are provided with simple PINs common to all devices of one model, such as 0000, 1234, or 6666. However, this solution results in a compromised authentication process as a nefarious party can use these known PINs to illegitimately authenticate their device with the user's device for RF-communications.

The authenticating of one device with another using Bluetooth for persistent communications is called pairing. After pairing, each device in the pair automatically accepts communication from the other device, bypassing the authentication process.

It is an object of the present invention to provide a method for authenticating devices for RF communications which is easy to use, secure, and overcomes the disadvantages of above methods, or to at least provide a useful alternative.

SUMMARY OF THE INVENTION

According to a first aspect of the invention there is provided a controller for an RF-capable communications device, comprising:

a processor arranged for converting the code into a non-RF signal;

a non-RF transmitter arranged for transmitting the code as the non-RF signal for consequent receipt by a second RF-capable communications device;

wherein the received code is arranged for use in authenticating the first device for RF communications with the second device.

The controller may include a memory arranged for storing the code.

The controller may include a processor arranged for generating the code.

The processor may generate the code according to a pseudorandom or random algorithm.

The processor may be further arranged for generated a new code for each authentication.

The code may be arranged to be received from the non-RF transmitter by an intermediary before consequent receipt by the second device. The intermediary may be a user. The code may be arranged to be received by the second device from the intermediary. The code may be arranged to be received by the second device from the intermediary through a user input device.

The non-RF transmitter may be a user output device. The user output device may be a visual display. The user output device may be an audio output.

The received code may be arranged for use in authenticating the first device for RF communications with the second device at the second device.

The code may be a PIN comprised of a plurality of digits.

The non-RF transmitter may be arranged to transmit the code via any one selected from the set of an audio communication, a visual communication, an I-R communication, and a tactile communication.

The code may be arranged for consequent receipt via any one selected from the set of an audio communication, a visual communication, an I-R communication, and a tactile communication.

The RF communications may be Bluetooth.

According to a further aspect of the invention there is provided a controller for an RF-capable communications device, comprising:

a non-RF receiver arranged for receiving a code as a non-RF signal, the code originating at a second RF-capable communications device;

a processor arranged for converting the received code from the non-RF signal;

wherein the received code is arranged for use in authenticating the second device for RF communications with the first device.

The code may be arranged to be received from the second device by an intermediary before being received by the non-RF receiver. The intermediary may be a user. The non-RF receiver may be arranged to receive the code from the intermediary.

The non-RF receiver may be a user input device. The user input device may be a keypad. The user input device may be an audio input.

The controller may include a processor arranged for authenticating the second device using the received code.

The code may be a PIN comprised of a plurality of digits.

The non-RF receiver may be arranged to receive the code via any one selected from the set of an audio communication, a visual communication, an I-R communication, and a tactile communication.

The RF communications may be Bluetooth.

According to a further aspect of the invention there is provided a controller for an RF-capable communications device, comprising:
- a non-RF receiver arranged for receiving a code as a non-RF signal from a first source, the code received also by a controller for a second RF-capable communications device from the first source; and
- a processor arranged for converting the received code from the non-RF signal;

wherein the received code is arranged for use in conjunction with the code received by the second device to authenticate the first device with the second device for RF communications.

The first source may be a user.

The code may be transmitted from the first source via any one selected from the set of an audio communication, a visual communication, an I-R communication, and a seismic communication.

The non-RF receiver may be arranged to receive the code via any one selected from the set of an audio communication, a visual communication, an I-R communication, and a seismic communication.

The code may be received by both devices from a common non-RF signal.

The first device may be authenticated at the second device.

The processor is arranged to convert the code into a PIN using a conversion module. The PIN may be arranged for use in an authentication process. Where the code is an audio signal, the conversion module may be arranged for identifying formants of the code and using the formants to seed a random number generator to produce the PIN.

The non-RF receiver may be a microphone and the controller of the second device may receive the code using a microphone.

The RF communications may be Bluetooth.

According to a further aspect of the invention there is provided a communications system comprising:
- a first and second device capable of transmitting and receiving RF communications;
- a controller for the first device capable of receiving or transmitting a code via a non-RF communication;
- a controller for the second device capable of receiving the code via a non-RF communication; and
- a processor for authenticating the first device for RF communication with the second device using the received code.

According to a further aspect of the invention there is provided a method for authenticating a first device with a second device, each device capable of transmitting and receiving RF communications, comprising the steps of:
i) transmitting a code via a non-RF communication from a controller at the first device;
ii) receiving the code via a non-RF communication at a controller for the second device; and
iii) authenticating the first device for RF communication with the second device using the received code.

According to a further aspect of the invention there is provided a method for authenticating a first device with a second device, each device capable of transmitting and receiving RF communications, comprising the steps of:
i) transmitting a code via a non-RF communication;
ii) receiving the code via a non-RF communication at a controller for the first device;
iii) receiving the code via a non-RF communication at a controller for the second device; and
iv) authenticating the first device for RF communication with the second device using the both received codes.

BRIEF DESCRIPTION OF THE DRAWINGS

Embodiments of the invention will now be described, by way of example only, with reference to the accompanying drawings in which.

DETAILED DESCRIPTION OF THE INVENTION

The present invention provides a secure method for authenticating a first device with a second device for RF communications. The first device transmits a PIN to a user via an output device, such as a speaker or visual display. The user enters the PIN on the second device to enable the second device to authenticate itself with the first device. Alternatively, a common signal, such as a phrase spoken by a user, is received by both devices. The two devices calculate a PIN based on the common signal, such as by extracting the formants of the audio phrase, and use the PIN to authenticate one device with the other. The PIN transmission and common signals are non-RF signals in order to prevent ready interception.

The invention will be described with reference to the pairing of two Bluetooth devices. However, it will be appreciated that, with minor modification, the method can be used for the authentication of any RF communication capable devices.

Figure 1:
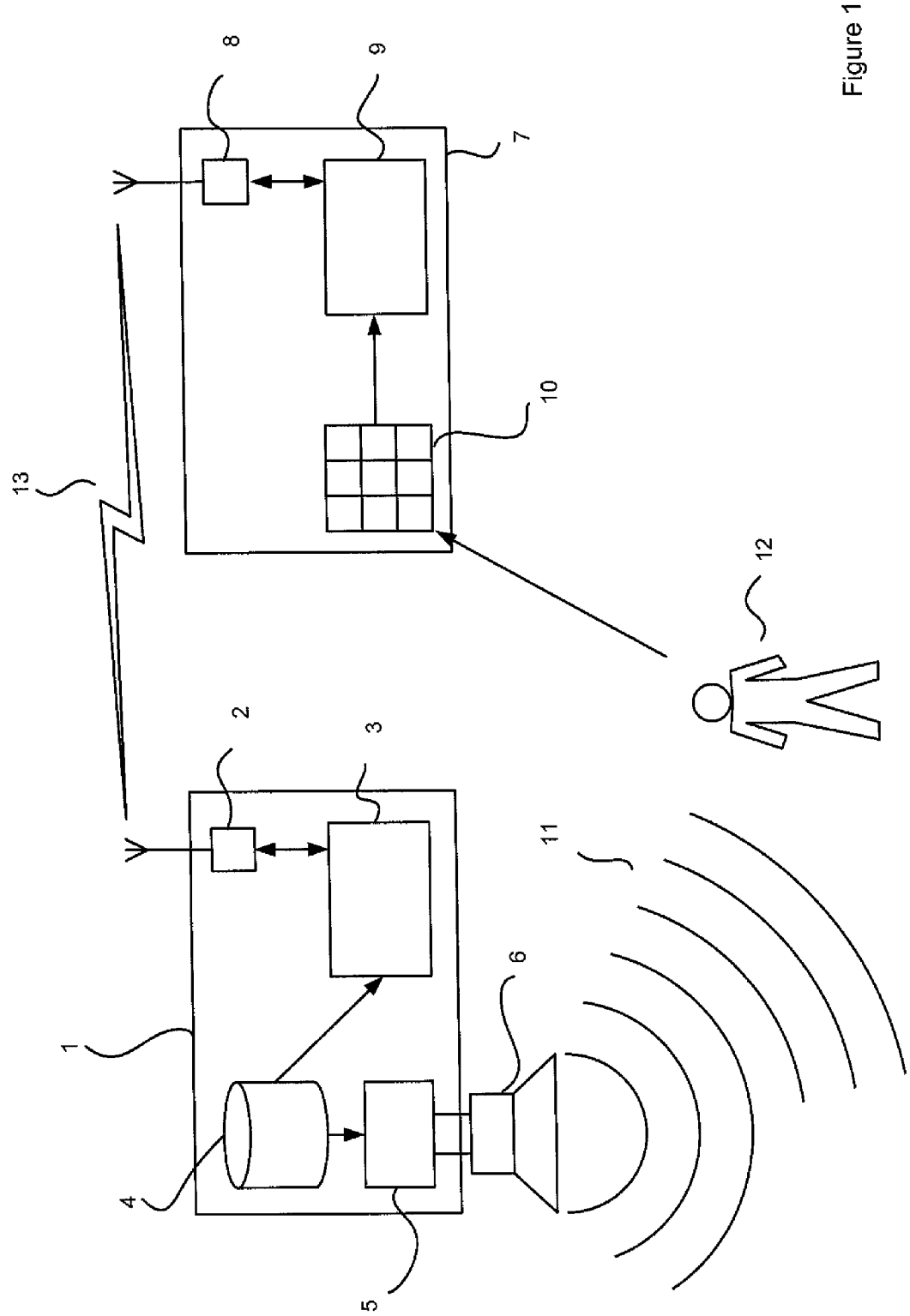
FIG. 1: shows a schematic diagram illustrating an embodiment of the invention in use.

FIG. 1 shows a first device 1 with an RF transceiver 2 connected to an authenticator unit 3. The first device 1 includes a memory 4 connected to the authenticator 3. The memory 4 may be RAM or ROM.

The first device 1 includes a processor 5 connected to the memory 4.

The first device 1 also includes a non-RF communications transmitter 6, connected to the processor 5, such as a speaker. The use of a speaker is advantageous in that headset/handset devices are already installed with a speaker.

The second device 7 for pairing with the first device 1 includes an RF transceiver 8 connected to an authenticator unit 9. The device 7 also includes a non-RF communications receiver 10 connected to the authenticator 7. In this example the receiver is a keypad 10. The use of other receivers can be envisioned, such as the use of a microphone or an IR/visual light detector (photo-detector).

The use of a keypad brings the advantage that handset devices often come installed with a keypad.

The memory 4 of the first device 1 is configured for storage of a PIN. The PIN is defined at time of manufacture.

Alternatively, the first device 1 also includes a processor 5 for random/pseudorandom generation of the PIN. A new PIN can then be generated for each pairing.

The processor 5 of the first device 1 is configured for converting the PIN into a form suitable for non-RF transmission. In this example, the processor 5 is a synthesizer which converts the PIN into an audio sample.

The non-RF communications transmitter 6 is configured to transmit 11 the PIN to a user 12.

It will be appreciated that another non-RF means of transmitting the PIN can be utilised, such as by transmitting the PIN to the user 12 by displaying the PIN on a LCD on the first device 1 or with an IR or visual light LED.

To authenticate the first device 1 with the second device 7 the user 12 actuates the first device 1 by pressing a pairing button or by switching the device into an "on state".

The first device 1 then synthesizes the PIN into an audio sample and transmits 11 the audio sample using the speaker 6. In this example, the first device 1 is a headset and the transmitter 6 for the headset is the earpiece of the headset.

The user 12 receives the audio sample of the PIN and enters the corresponding numerical digits on the keypad 10 of the second device 7. For example, if the audio sample is "Your PIN is one-three-seven-eight-nine-nine", the user 12 enters "137899" into the keypad 10.

Alternatively, if the receiver 10 of the second device 7 is a microphone the user 12 can speak the PIN directly into the microphone. A disadvantage of the alternative method is that the second device 7 may need to include a processor configured for speech recognition.

The PIN is then provided to an authenticator unit 9 within the second device 7 which uses the PIN to communicate via RF communication 13 with the authenticator 3 of the first device 1 to pair the two devices by a standard key exchange method.

One potential advantage of this embodiment of the present invention is that the user is not required to remember the PIN. Due to this the PIN can comprise more digits than the typical 4-digit PIN. An increase in PIN size increases security.

Figure 2:
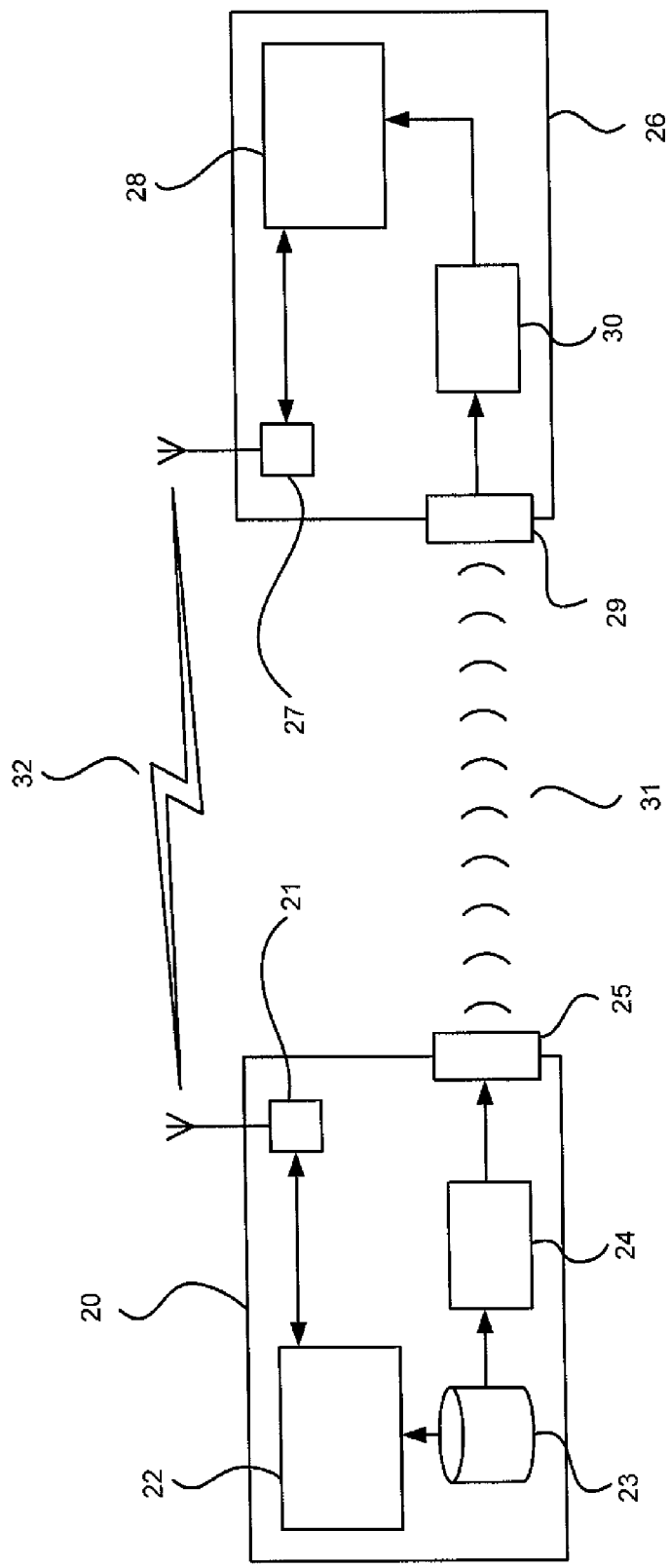
FIG. 2: shows a schematic diagram illustrating another embodiment of the invention in use.

FIG. 2 shows an alternative embodiment of the invention.

A first device 20 is shown with an RF transceiver 21 connected to an authenticator unit 22. The first device 20 includes a memory 23 connected to the authenticator unit 22 and a processor 24 connected to the memory 23. The first device 20 also includes a non-RF transmitter 25 connected to the processor 24, such as an audio, light, or IR transmitter.

A second device 26 is shown with an RF transceiver 27 connected to an authenticator unit 28. The second device 26 includes a non-RF receiver 29 corresponding to the non-RF transmitter 25 of the first device 20. The second device 26 also includes a processor 30 connected to the authenticator unit 28 and the non-RF receiver 29.

The memory 23 of the first device 20 is configured for storage of a PIN and the processor of the first device 20 is configured for converting the PIN into a transmittable signal.

The processor 30 of the second device 26 is configured for converting the signals received by the non-RF receiver 29 into a PIN for use by the authenticator unit 28.

The user holds the two devices within communicable distance for the purpose of non-RF communications 31 and in line-of-sight if necessary. Upon actuation the first device 20 transmits the PIN via the non-RF communications 31. The second device 26 receives the PIN signal using its non-RF receiver 29 and converts it into a string of digits for use by its authenticator unit 28.

The first device 20 can be actuated via button press, icon selection within a user interface, or voice command.

It will be appreciated that the second device 26 can also include an actuator which places the device into a receptive state for receiving the non-RF communication.

The authenticator 22 of the first device 20 extracts the PIN from the memory 23 and the authenticator 22 and the authenticator 28 pair the two devices 20 and 26 by a standard key exchange method over RF communications 32 using the PIN.

Figure 3:
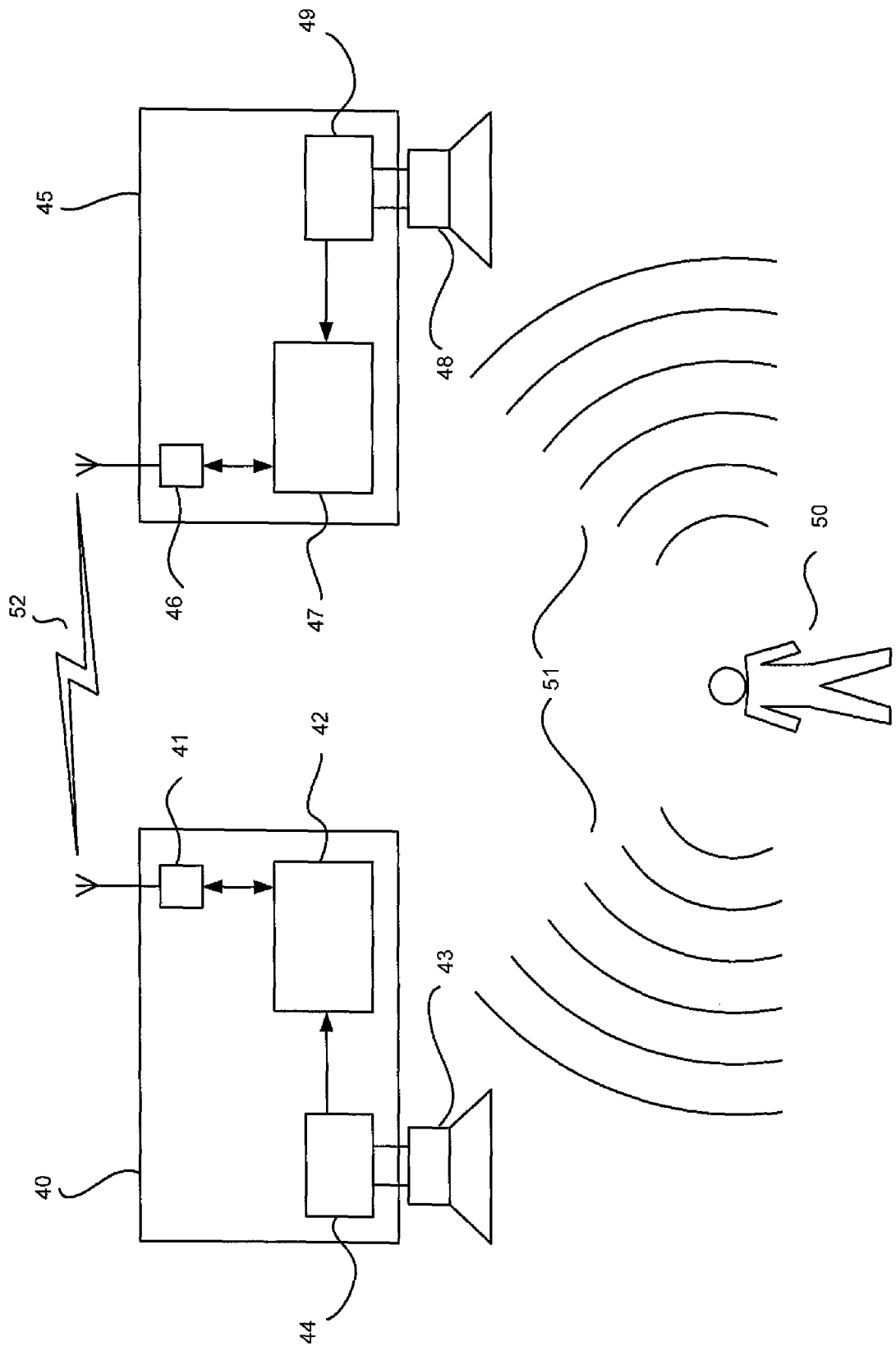
FIG. 3: shows a schematic diagram illustrating yet another embodiment of the invention in use.

FIG. 3 shows a yet further embodiment of the invention.

A first device 40 is shown with an RF transceiver 41 connected to an authenticator unit 42. The first device 40 includes a non-RF receiver 43, such as a seismic, audio, light, or IR detector. The first device 40 also includes a processor 44 connected to the non-RF receiver 43 and the authenticator unit 42.

A second device 45 is shown with an RF transceiver 46 connected to an authenticator unit 47. The second device 45 includes a non-RF receiver 48 corresponding to the non-RF receiver 43 of the first device 40. The second device 45 also includes a processor 49 connected to the non-RF receiver 48 of the second device 45 and the authenticator unit 47 of the second device 45.

The processors 44 and 49 of both devices 40 and 45 are configured for processing non-RF signals for use by the corresponding authenticator units 42 and 47.

The user 50 places both devices 40 and 45 into a state receptive to receiving non-RF communications 51. In this example, the user 50 accomplishes this by pressing a button, selecting an icon within a user interface, or issuing a voice command to both devices.

The user 50 then produces a common signal 51 receivable by both devices 40 and 45. In this example, the user produces an audio signal 51 by speaking out loud a phrase. Other signals such as the user 50 tapping both devices together to produce a seismic signal could be used.

Each device 40 and 45 receives the common signal 51. Both devices 40 and 45 convert the signal into a PIN and provide the PIN to the authenticator units 42 and 47 to pair the first and second devices 40 and 45 using RF communications 52.

In one embodiment an algorithm is used by each processor 44 and 49 to convert the signal. The algorithm identifies the formants within the phrase of the received audio signal and uses this to seed a random number generator to create the PIN. Alternative algorithms can be envisioned.

In an alternative embodiment both processors 44 and 49 digitize the signal 51 and provide the digitized signal directly to the authenticator units 42 and 47 for use as an inter-device key.

Figure 4:
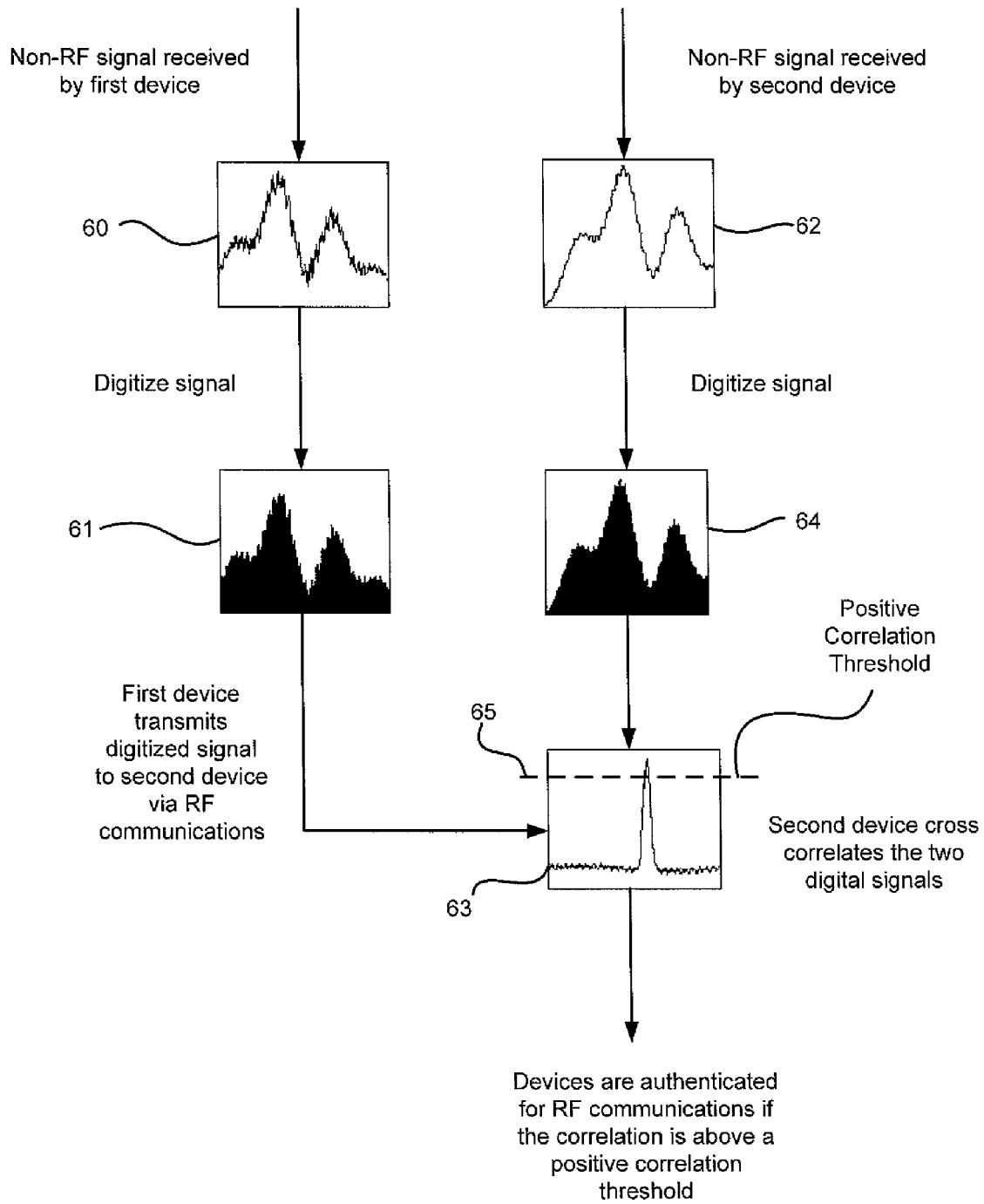
FIG. 4: shows a diagram illustrating temporal cross correlation of digitized signals according to a method of the invention.

In a yet further alternative embodiment, shown in FIG. 4, one device digitizes the signal 60 received via non-RF communications and transmits the digitized signal 61 via RF communications to the other device. The other device digitizes the signal 62 it received via non-RF communications and performs a temporal cross correlation 63 with both digitized signals 61 and 64. If the digitized signals exceed a positive correlation threshold 65, the first device is authenticated for RF communication with the second device.

One potential advantage of embodiments of the present invention is that the use of non-RF means for transmitting information used to authenticate the devices with each other results in a lower risk of interception of the information transmitted.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

The invention claimed is:

1. An RF-capable communications device arranged to be placed in a state receptive to non-RF communications prior to an authentication process with another RF-capable communications device, comprising:
   a non-RF receiver arranged to receive from a first source when the RF-capable communications device is placed in a state receptive to non-RF communications a code as an audio signal, the code also being in a signal received from the first source by said other RF-capable communications device; and
   a processor comprising a conversion module arranged to identify formants of the received code and using the formants to seed a random number generator to produce a PIN, wherein the processor is further arranged to convert the received code from the audio signal into a PIN using the conversion module;
   wherein the received code is arranged for use in conjunction with the code received by said other RF-capable communications device to authenticate the RF-capable communications device with said other RF-capable communications device for RF communications.

2. An RF-capable communications device as claimed in claim 1 wherein the first source is a user.

3. An RF-capable communications device as claimed in claim 1 wherein the RF-capable communications device is authenticated at said other RF-capable communications device.

4. An RF-capable communications device as claimed in claim 1 wherein the PIN is arranged for use in the authentication process.

5. An RF-capable communications device as claimed in claim 1 wherein the non-RF receiver is a microphone and said other RF-capable communications device receives the code using a microphone.

6. An RF-capable communications device as claimed in claim 1 wherein the RF communications are Bluetooth communications.

7. An RF-capable communications device as claimed in claim 1, wherein the code is received by both devices from a common audio signal.

8. A communications system comprising:
   a first RF-capable communications device capable of receiving a code via an audio signal, and arranged to be placed in a state receptive to non-RF communication prior to an authentication process with a second RF-capable communications device;
   a second RF-capable communications device capable receiving said code via an audio signal, and arranged to be placed in a state receptive to non-RF communication prior to an authentication process with said first RF-capable communications device; and
   a processor for authenticating the first RF-capable communications device with the second RF-capable communications device using the received code, the processor comprising a conversion module arranged to identify formants of the received code and to use the formants to seed a random number generator to produce a PIN, wherein the processor is arranged to convert the received code from the audio signal into a PIN using the conversion module.

9. A method for authenticating a first device with a second device, each device capable of transmitting and receiving RF communications, comprising the steps of:
   i) placing the first device and the second device into a state receptive to receiving non-RF communications;
   ii) transmitting a code via an audio signal;
   iii) receiving the code via an audio signal at a controller for the first device;
   iv) receiving the code via an audio signal at a controller for the second device;
   v) converting the received code into a PIN by identifying formants of the code and using the formants to seed a random number generator to produce the PIN; and
   vi) authenticating the first device for RF communication with the second device using both the received codes.

* * * * *